United States Patent [19]

Napoli et al.

[11] Patent Number: 4,466,239
[45] Date of Patent: Aug. 21, 1984

[54] GAS TURBINE ENGINE WITH IMPROVED AIR COOLING CIRCUIT

[75] Inventors: Phillip D. Napoli, West Chester; Robert W. Harris, Fairfield; Thomas A. Brisken, Cincinnati, all of Ohio

[73] Assignee: General Electric Company, Cincinnati, Ohio

[21] Appl. No.: 468,216

[22] Filed: Feb. 22, 1983

[51] Int. Cl.³ .............................................. F02G 3/00
[52] U.S. Cl. ................................ 60/39.02; 60/39.75; 415/116; 415/172 A
[58] Field of Search ................ 60/39.02, 39.75, 39.07; 415/115, 116, 117, 170 R, 172 R, 172 A

[56] References Cited

U.S. PATENT DOCUMENTS

| | | | |
|---|---|---|---|
| 2,647,684 | 8/1953 | Lombard | 60/39.75 X |
| 3,452,542 | 7/1969 | Saferstein et al. | 60/39.75 X |
| 3,986,720 | 10/1976 | Knudsen et al. | 277/26 |
| 3,989,410 | 11/1976 | Ferrari | 415/116 X |
| 4,103,899 | 8/1978 | Turner | 277/1 |

Primary Examiner—Louis J. Casaregola
Assistant Examiner—Donald E. Stout
Attorney, Agent, or Firm—Derek P. Lawrence

[57] ABSTRACT

A cavity is defined between the rotating and stationary parts of a gas turbine engine through which cavity air is circulated. Upstream and downstream seals are disposed at opposite ends of the cavity for regulating the circulation of air flowing into and out of the cavity. A cooling air circuit for the engine rotor is provided which channels air from the stationary portion of the engine to the rotor through the cavity therebetween. The rotor air cooling circuit includes an inducer chamber where the cooling air is accelerated and transferred to the engine rotor. The inducer chamber is defined by two additional seals which, in conjunction with the other cavity seals define chambers upstream and downstream of the central inducer chamber. A bypass circuit directs the air circulated within the upstream chamber directly to the downstream chamber (bypassing the inducer chamber) so that the coolant air flowing through the inducer chamber is not contaminated with the air circulated between the engine rotor and stator.

13 Claims, 4 Drawing Figures

GAS TURBINE ENGINE WITH IMPROVED AIR COOLING CIRCUIT

BACKGROUND OF THE INVENTION

The Government has rights in this invention pursuant to Contract F33657-79-C-0176 awarded by the Dept. of the Air Force.

This invention relates to gas turbine engines and in particular to the air cooling circuits which are incorporated into such engines.

Gas turbine engines internally ignite fuel to provide propulsion for aircraft or the like. The ignition of the fuel causes these engines to operate at very high temperatures. In order to avoid overheating, it is desirous to provide means to cool various parts of the engine during operation. In particular, the rotating blades (collectively referred to as the rotor) and stationary vanes (collectively referred to as the stator) of the turbine, which lie downstream of the combustor, must be cooled to function efficiently. The turbine vanes and blades are typically provided with arrays of apertures through which air may be circulated to provide this cooling function.

Conventionally, air is fed to the combustor of the engine by an intake compressor or fan or both. Some of this air is diverted and used as a coolant. The coolant air may be directly circulated to stator components of the engine and also through the internal cavity defined between the engine rotor and stator. Before the coolant air can be circulated through the turbine blades, however, it must be transferred to the rotor structure of the engine, which structure rotates very rapidly during operation.

It is known that the temperature of the air which is circulated between the engine rotor and stator becomes elevated and unsuitable for usage in cooling the blades of the turbine. Accordingly, cooling circuits have been designed to transfer coolant air to the engine rotor via an inducer chamber, defined at one end of the cavity between the engine rotor and stator. The inducer chamber is sealed off from the remainder of the cavity and is bypassed by the air which cools the cavity. Accordingly, in theory, the coolant air for the turbine blades is directed from the engine stator through the inducer chamber and into the rotor structure without contamination by the air circulated in the remainder of the cavity.

The effectiveness of such an air circuit design is dependent upon the effectiveness of the seals provided to partition the inducer chamber from the remainder of the cavity between the rotor and stator. However, in conventional designs, it has been found that seal effectiveness deteriorates during transient and take off conditions due to the rapid change of temperatures occurring within the engine at these times. Attempts have been made to remedy this situation by designing rotor and stator parts of specially selected materials which have thermal expansion characteristics selected to achieve a good rotor-stator match during such transient conditions. Such a construction is described in U.S. Pat. No. 3,986,720 assigned to the assignee of the present invention.

It is an object of the present invention to provide a gas turbine engine structure having an improved air cooling circuit which directs air through an inducer chamber defined between stationary and rotating engine parts such that contamination of the cooling air is reduced.

It is another object of the present invention to provide such a cooling circuit having a more effective air bypass and seal design for the inducer chamber of the circuit.

Other objects and advantages of the present invention will become apparent from the following portion of the specification and from the accompanying drawings which illustrate the principles of the invention.

SUMMARY OF THE INVENTION

In one form of the invention, a cavity is defined between the rotating and stationary parts of a gas turbine engine through which cavity air is circulated. Upstream and downstream seals are disposed at opposite ends of the cavity which regulate the circulation of air flowing into and out of the cavity. A cooling air circuit for the engine rotor is provided which channels air from the stationary portion of the engine to the rotor through the cavity therebetween. The rotor air cooling circuit includes an inducer chamber where the cooling air is accelerated and transferred to the engine rotor. The inducer chamber is defined by two additional seals which in conjunction with the other cavity seals define chambers upstream and downstream of the central inducer chamber. A bypass circuit directs the air circulated within the upstream chamber directly to the downstream chamber (bypassing the inducer chamber) so that the coolant air flowing through the inducer chamber is not contaminated with the air circulated between the engine rotor and stator.

Another aspect of the invention pertains to the disassociation of the inducer chamber structure from end seal support brackets made from special materials which avoids problems associated with weld joints caused by the varying temperatures within the engine during its operation without sacrificing seals designed to provide a good match between the thermal growth characteristics of the stationary and rotating parts.

Additionally, the inventive cooling circuit provides for the reduction in size of the radius of the upstream inducer chamber seal over conventional engines of this type and the separation thereof from the high response portions of the inducer structure thereby resulting in more efficient sealing and less deterioration during operation of the engine.

DETAILED DESCRIPTION

Figures 1, 2:
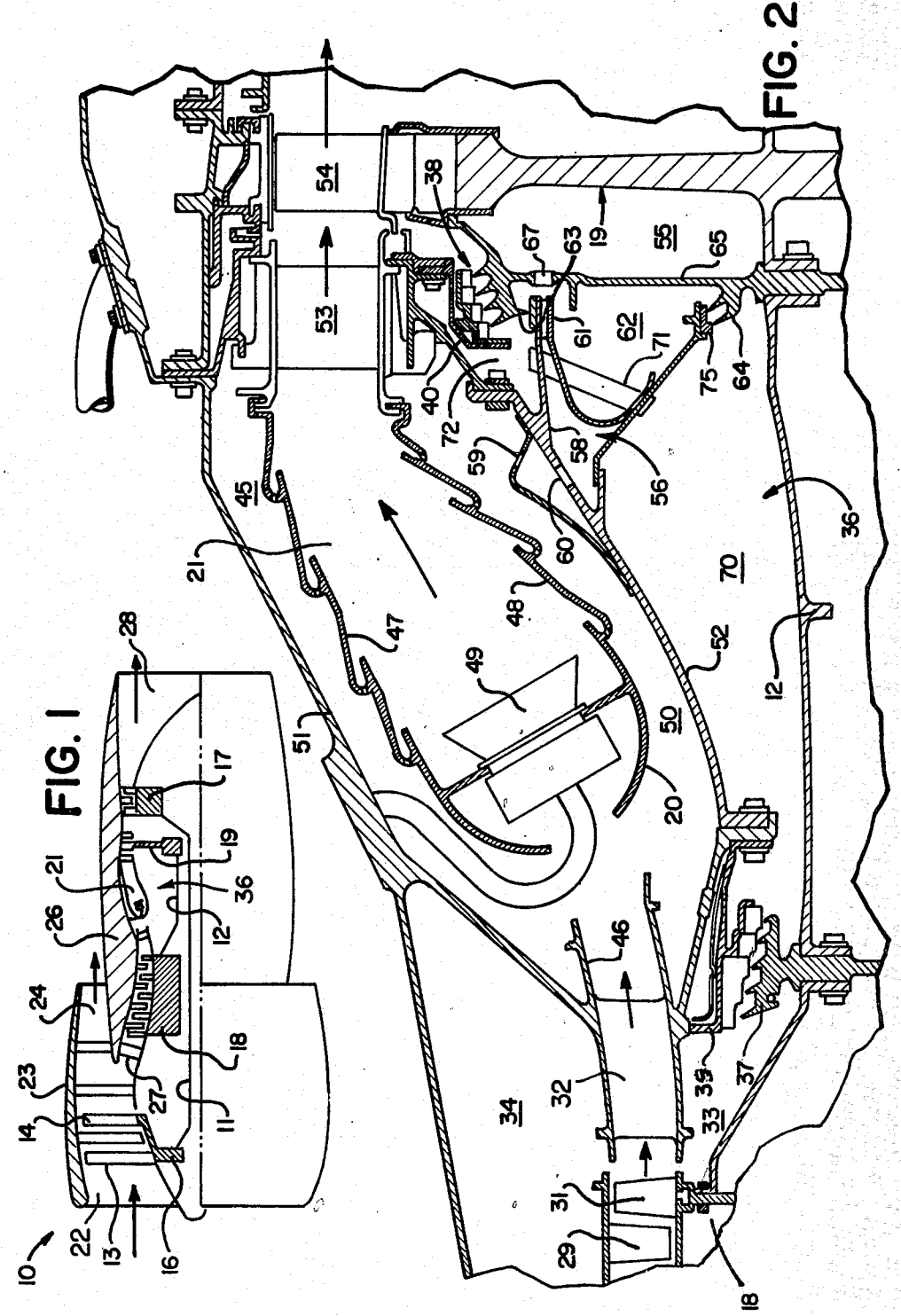
FIG. 1 is a schematic representation of a gas turbine engine in which one form of the present invention may be utilized.
FIG. 2 is a partial section view of the gas turbine engine shown in FIG. 1 showing the particular details of one form of the present invention.

Referring now to FIG. 1, a turbofan engine 10 is shown to include a fan rotor 11 and a core engine rotor 12. The fan rotor 11 includes a plurality of fan blades 13 and 14 mounted for rotation on a disc 16 and a low pressure or fan turbine 17, which drives the fan disc 16 in a well-known manner. Core engine rotor 12 includes a compressor 18 and a high pressure turbine 19 which drives the compressor 18. The core engine also includes a combustion system 21 which combines a fuel with the air flow and ignites the mixture to inject thermal energy into the system.

In operation, air enters the gas turbine engine 10 through an air inlet 22 provided by means of a suitable cowling or nacelle 23 which surrounds the fan rotor 11. Air entering the inlet 22 is compressed by means of the rotation of the fan blades 13 and 14 and thereafter is split between an annular passageway 24 defined by the nacelle 23 and an engine casing 26, and a core engine passageway 27 having its extended boundary defined by the engine casing 26. The pressurized air which enters the core engine is further pressurized by means of the compressor 18 and thereafter ignited along with high energy fuel from the combustion system 21. This highly energized gas stream then flows through the high pressure turbine 19 to drive the compressor 18 and thereafter through the fan turbine 17 to drive the fan rotor disc 16. Gas is then passed out the main nozzle 28 to provide propulsion forces to the engine in a manner well known in the art. Additional propulsive force is gained by the exhaust pressurized air from the annular passage 24.

Referring now more specifically to that portion of the engine surrounding the combustion system 21, FIG. 2 shows the compressor 18 having stationary compressor stator vanes 29 and rotating rotor blades 31 which act to discharge high pressure air rearwardly toward the guide vane 32. A portion of the CDP (compressor discharge pressure) air passes to the inner and outer sides of the guide vanes and to the annular areas 33 and 34 where it is used for cooling purposes. In particular, the CDP air which passes into area 33 is circulated through an internal cavity 36 defined between the stationary combustion system 21 and the engine core rotor 12. The flow of air through this cavity 36 is regulated by an upstream five-tooth seal 37 which retards the flow of air into the cavity 36 and a downstream four-tooth seal 38 which retards the flow of air out of the cavity 36 into the exhaust stream of the combustor 20. Brackets 30, 40 which support the stationary portions of the seals 37, 38 respectively, are constructed of materials designed to provide a good match of thermal expansion characteristics with the rotor 12 to maintain a close clearance within the seals. The circulation of the CDP air through the cavity 36 serves to cool portions of the rotor and stator which define the cavity. However, this air becomes heated and is unsuitable for further use as a coolant.

The principal portion of the CDP air passes the guide vane 32 through the stepped diffuser 46 and into and around the combustor 20. The combustor 20 is comprised of outer and inner liners 47 and 48 disposed so as to mutually form an annular combustion chamber into which fuel is injected by way of a fuel nozzle 49 which extends inwardly through the combustion case 51. Cooling of the combustor 20 is attained by the flow of air from the diffuser 46 into the annular passageway 45 defined by the combustor outer liner 47 and the combustion case wall 51. Similarly, on the inner side of the combustor, an annular chamber 50 is defined by the inner liner 48 and the interior combustion case wall 52 to cool that portion of the combustor. Following the mixture of fuel from the nozzle 49 and air from the diffuser 46 (and subsequent ignition of the mixture in the combustor 20), the hot gases flow rearwardly from the combustion system 21 to a row of circumferentially spaced high pressure nozzles 53, and then further rearwardly to impinge on the circumferentially spaced row of turbine blades 54 of the high pressure turbine 19.

The hot expanded gases passing from the combustor system 21 pass through the turbine nozzles 53 and turbine blades 54 in a high pressure state. At the same time, there is a circulation of coolant air to maintain the temperatures of the components at an acceptable temperature level. Coolant air for the turbine blades 54 originates in the annular chamber 50 surrounding the combustor. This air is transferred into a chamber 55 within the engine core rotor 12 from where it is directed through the turbine blades 54 in a conventional manner. Accordingly, a cooling air circuit 56 is provided to transfer the coolant air from chamber 50 through the cavity 36 (via chamber 62) defined between the stationary combustor system 21 and the core rotor 12 without being contaminated by the CDP air which is circulated through the cavity 36.

Figure 3:
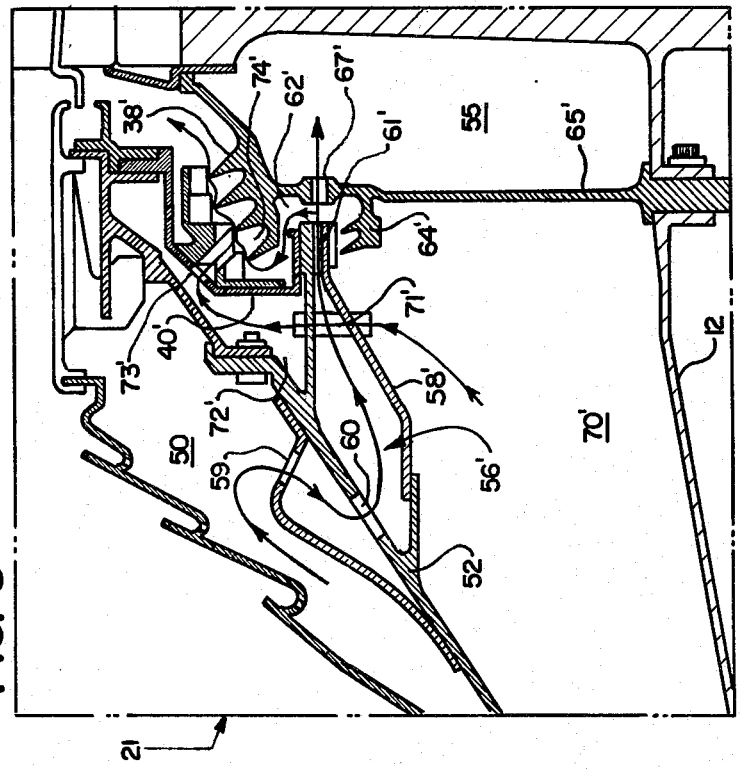
FIG. 3 is a partial section view of a prior art gas turbine engine.

FIG. 3 shows a conventional air circuit 56' for transferring the coolant air into the rotor chamber 55. Coolant air from within the annular chamber 50 passes into a manifold 58' via apertures 59, 60. The air exits the manifold 58' through expander nozzles 61' and enters an inducer chamber 62' defined by a two-tooth inducer seal 64' and the four-tooth cavity seal 38'. The nozzles 61' channel the coolant air tangentially toward a turbine seal disc 65' having an annular array of apertures 67' which communicate with the interior rotor chamber 55. Accordingly, the coolant air flowing through the inducer cavity 62' is accelerated. It then passes through the disc holes 67' and enters the interior chamber 55 of the rotor from where it is channeled to cool the turbine blades.

In this conventional design, the internal cavity between the combustion system 21 and the rotor core 12 is partitioned into two chambers 70', 62' by the inducer seal 64'. That seal retards the airflow from the forward chamber 70', where the CDP air is circulated, into the inducer chamber 62'. The CDP air is channeled through crossover conduits 71' in the manifold 58' into a pocket 72' defined by the combustor case wall 52, the seal support bracket 40' and the manifold 58'. The CDP air then is vented between the first and second teeth of the four-tooth seal 38' through apertures 73' defined therein.

In theory, the two-tooth inducer seal 64' minimizes the contamination of the cooling air passing through chamber 62' by promoting the flow of CDP air into the first toothed pocket 74' of the four-tooth seal 38' where it aerodynamically blocks the seal and reduces the seals' parasitic flow requirement which siphons air from the inducer cavity 62'. Failure of the inducer seal 64' to effectively perform its function results in increased blade coolant temperature, increased metal temperature and reduced blade life. The increase in turbine blade temperature during take off can result in a reduction in the available thrust. It has been found in engines embodying this conventional design that functional deterioration of the inducer seal 64' due to transient engine operation increases the temperature of the turbine blades by 25° to 35° F. at take off power and reduces blades cycle and rupture life by 20% and 50% respectively.

Figure 4:
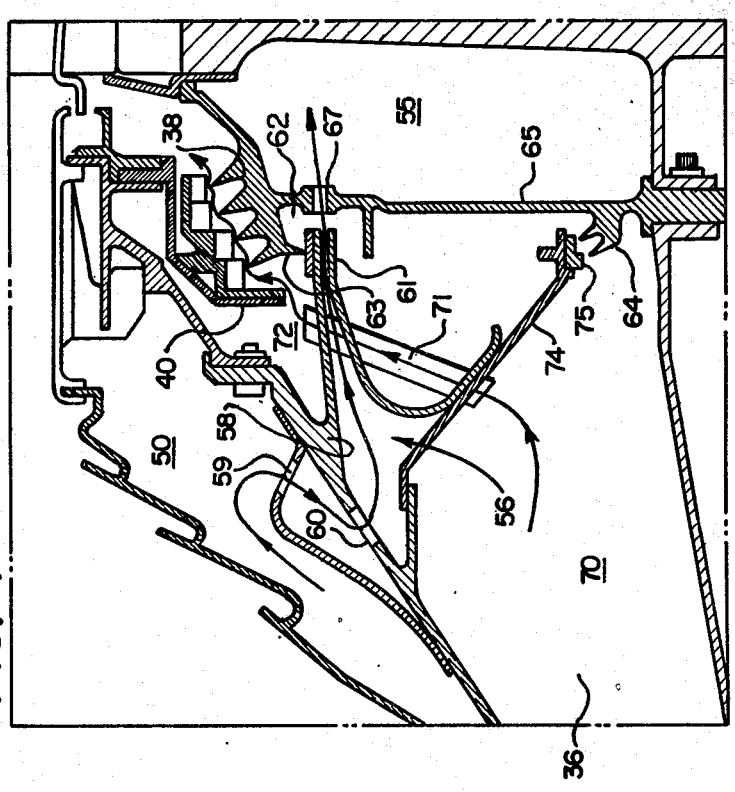
FIG. 4 is an enlarged view of a portion of the gas turbine engine shown in FIG. 2 showing an inducer cavity construction made in accordance with the teachings of the present invention.

As best seen in FIG. 4, the construction of the cooling circuit according to the present invention differs in several respects. An outer one-tooth inducer seal 63 and an inner stepped, two-tooth inducer seal 64 partition the cavity 36 into a forward chamber 70, a central inducer chamber 62, and a rearward chamber 72. A selectively configured crossover manifold 58 is provided which directs coolant air from chamber 50 into the inducer chamber 62 through high thermal response expander nozzles 61. Crossover conduits 71 are provided for permitting CDP air to flow directly from the forward chamber 70 into the rearward chamber 72 bypassing the inducer chamber 62.

Unlike the conventional design shown in FIG. 3, the manifold 58 is separated from the bracket 40 of the four-tooth seal 38. The separation of the bracket 40 from the manifold 58 permits the usage of different materials for each of those components to provide a good rotor-stator match during both steady state and transient operation of the engine without the need for a bi-metal weld joint. Accordingly, the problems associated with bi-metal weld joints resulting from thermal expansion property differences are eliminated.

The manifold 58 has an inwardly projecting extension 74 which supports the stationary seat 75 of the two-tooth seal 64. Accordingly, not only is that seal 64 separated from the expander nozzle 61, but also the radius of the seal 64 is reduced compared with the conventional design (shown in FIG. 3). The mechanical and thermal decoupling of the seal seat 75 from the high response expander nozzles 61 better enables stator thermal response matching by stator mass and material property manipulation. Lowering the seal radius reduces the overall mechanical growth excursion exhibited by the rotor component of seal 64 during steady state and transient operation. These features coupled with the stepped toothed design for that seal 64 result in reduced seal deterioration, improved operating clearance, and reduced leakage area in flow.

While the inner inducer seal 64 promotes the CDP air flow from the first chamber 70 through the bypass conduits 71, the one-tooth outer inducer seal 63 increases flow resistance between the inducer chamber 62 and the rearward chamber 72 from which the flow requirements of the rearward four-tooth seal 38 must be satisfied. This one-tooth seal 63 results in increased inner inducer seal back pressures, reduced seal operating pressure ratio, and increased seal flow resistance when compared to the prior art design shown in FIG. 3. Also, the one-tooth seal 63 has an inverted construction (as compared to the other seals) having its seat portion circumscribed by its tooth portion. This construction enables the outer inducer seal 63 to function properly even though it is coupled to the high response nozzle 61.

The effectiveness of these inducer seals 63, 64 is increased by providing a manifold 58 constructed of a material to match the growth characteristics of the stator to that of the rotor. In the preferred embodiment, the manifold 58 is constructed out of Rene' 41 or Inconel 718, nickel based superalloys, commercially available and well known in the art; the crossover conduits 71 have a diameter of approximately 0.375 inches which is 1.5 times greater than the diameter of the crossover conduits 71' in the conventional design. Also, the present invention simplifies the design of the four-tooth seal 38 since it communicates directly with the rearward cavity 72 into which the CDP air is directed. The integration of the aforementioned features into an unified system increases the effectiveness of the rotor cooling circuit and improves performance and turbine blade life.

While the present invention has been described with reference to specific embodiments thereof, it will be obvious to those skilled in the art that various changes and modifications may be made without departing from the invention in its broader aspects. It is contemplated in the appended claims to cover all variations and modifications of the invention which come within the true spirit and scope of our invention.

What is claimed as new and desired to be secured by Letters Patent of the United States is:

1. An improved turbomachine comprising:
a rotor assembly;
an annular combustor case positioned concentrically about said rotor assembly;
first and second seal means between said rotor assembly and said combustor case defining a cavity therebetween;
third and fourth seal means between said rotor assembly and said combustor case for partitioning said cavity into upstream, central, and downstream chambers;
said combustor case and said rotor assembly each including means communicating with said central chamber for defining a cooling air circuit therethrough; and
means communicating said upstream chamber directly with said downstream chamber for bypassing said cooling air circuit and thereby retarding airflow into and out from said central chamber with respect to said upstream and downstream chambers.

2. In a turbomachine having a compressor for feeding air to a combustor which drives a high pressure turbine to power the compressor, the improvement comprising:
rotor means connecting the compressor and the turbine;
an annular combustor case concentrically positioned about said rotor means defining a cavity therebetween;
first seal means between said rotor means and said combustor case for retarding air flow from the compressor into said cavity;
second seal means between said rotor means and said combustor case for retarding air flow from said cavity into the high pressure turbine;
third and fourth seal means between said rotor means and said combustor case for partitioning said cavity into:
an upstream chamber defined by said first and third seal means;
a central chamber defined by said third and fourth seal means; and
a downstream chamber defined by
said second and fourth seal means;
said combustion case and said rotor means each including means communicating with said central chamber for defining a cooling air circuit therethrough; and
means communicating said upstream chamber directly with said downstream chamber for bypassing said cooling air circuit and thereby retarding airflow into and out from said central chamber with respect to said upstream and downstream chambers.

3. A turbomachine according to claim 2 wherein:
a crossover manifold structure comprises said combustor case central chamber communicating means and said upstream chamber downstream chamber communicating means; and
said rotor means central chamber communicating means comprises an annular array of apertures.

4. A turbomachine according to claim 2 wherein:
a stepped five-tooth seal comprises said first seal means;
a stepped four-tooth seal comprises said second seal means;
a stepped two-tooth seal comprises said third seal means; and
a one-tooth seal comprises said fourth seal means.

5. A turbomachine according to claim 4 wherein said one-tooth seal comprises a seat portion circumscribed by a tooth portion of said seal.

6. A turbomachine according to claim 3 wherein said crossover manifold includes:
expander nozzle means communicating with said central chamber; and
means for supporting said third seal means inwardly spaced from said expander nozzle means.

7. A turbomachine according to claim 6 wherein:
said crossover manifold structure comprises a nickel base superalloy.

8. A turbomachine having a compressor for feeding air to a combustor to drive a high pressure turbine to power the compressor, the turbomachine comprising:
rotor means connecting the compressor and the turbine;
an annular combustor case concentrically positioned about said rotor means defining a cavity therebetween through which air from the compressor is circulated into the exhaust stream of the combustor;
first seal means between said rotor means and said combustor case for regulating the flow of air from the compressor into said cavity;
second seal means between said rotor means and said combustor case for regulating air flow from said cavity into the exhaust stream of said combustors;
means for transferring coolant air from within said combustor case through said cavity into said rotor means including:
a manifold extending from said combustor case into said cavity;
third and fourth seal means between said manifold and said rotor means partitioning said cavity into:
a forward chamber defined by said first and third seal means;
a central chamber defined by said third and fourth seal means; and
a rearward chamber defined by said second and fourth seal means; and
said manifold including bypass conduits communicating said forward chamber with said rearward chamber.

9. A turbomachine according to claim 8 wherein said manifold includes:
expander nozzle means communicating with said central chamber; and
means for supporting said third seal means inwardly spaced from said expander nozzle means.

10. A turbomachine according to claim 8 wherein:
said manifold structure comprises a nickel base superalloy.

11. In a turbomachine having a rotor assembly, an annular combustor case concentrically positioned about the rotor assembly defining a cavity therebetween, a first seal between the rotor assembly and the combustor case for retarding air flow into the cavity, and a second seal between the rotor assembly and the combustor case for retarding air flow out of the cavity, the method of circulating coolant air from the combustor case into the rotor assembly comprising:
partitioning said cavity into:
an upstream chamber defined by said first seal and a third seal;
a central chamber defined by said third seal and a fourth seal; and
a downstream chamber defined by said second and fourth seals;
channeling coolant air from the combustion case, through said central chamber, and into the rotor assembly; and
channeling air from said upstream chamber into said downstream chamber, bypassing said central chamber, thereby retarding air flow into and out from said central chamber with respect to said upstream and downstream chambers.

12. The method according to claim 11 further comprising:
providing a crossover manifold for channeling coolant air from the combustor case into said central chamber of said cavity and for channeling air from said upstream chamber directly into said downstream chamber of said cavity; and
providing aperture means in the rotor assembly for channeling coolant air from said central chamber into the rotor assembly.

13. The method according to claim 12 wherein the provided crossover manifold comprises a nickel base superalloy.

* * * * *